E. C. NEWCOMB.
INTERNAL COMBUSTION ENGINE.
APPLICATION FILED MAY 1, 1909. RENEWED SEPT. 9, 1913.
1,139,898.
Patented May 18, 1915.
4 SHEETS—SHEET 4.
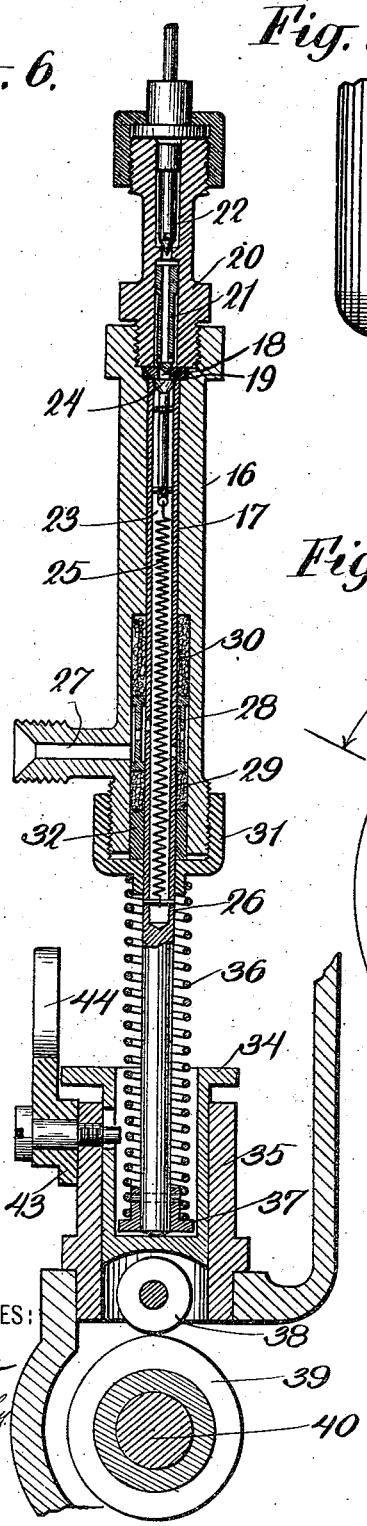
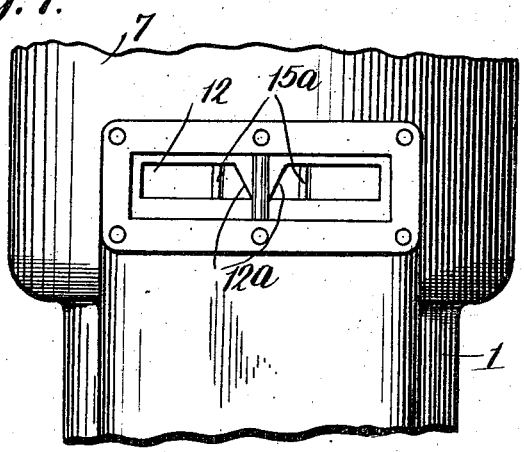
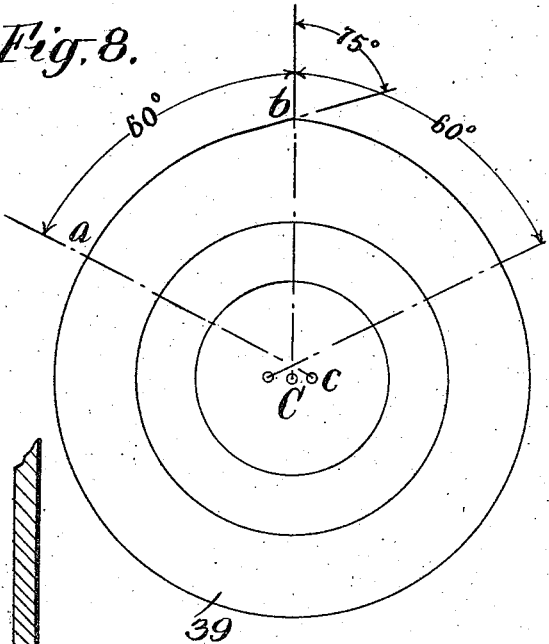
INVENTOR
Edward C. Newcomb
BY
J. H. Freeman
ATTORNEY
WITNESSES:

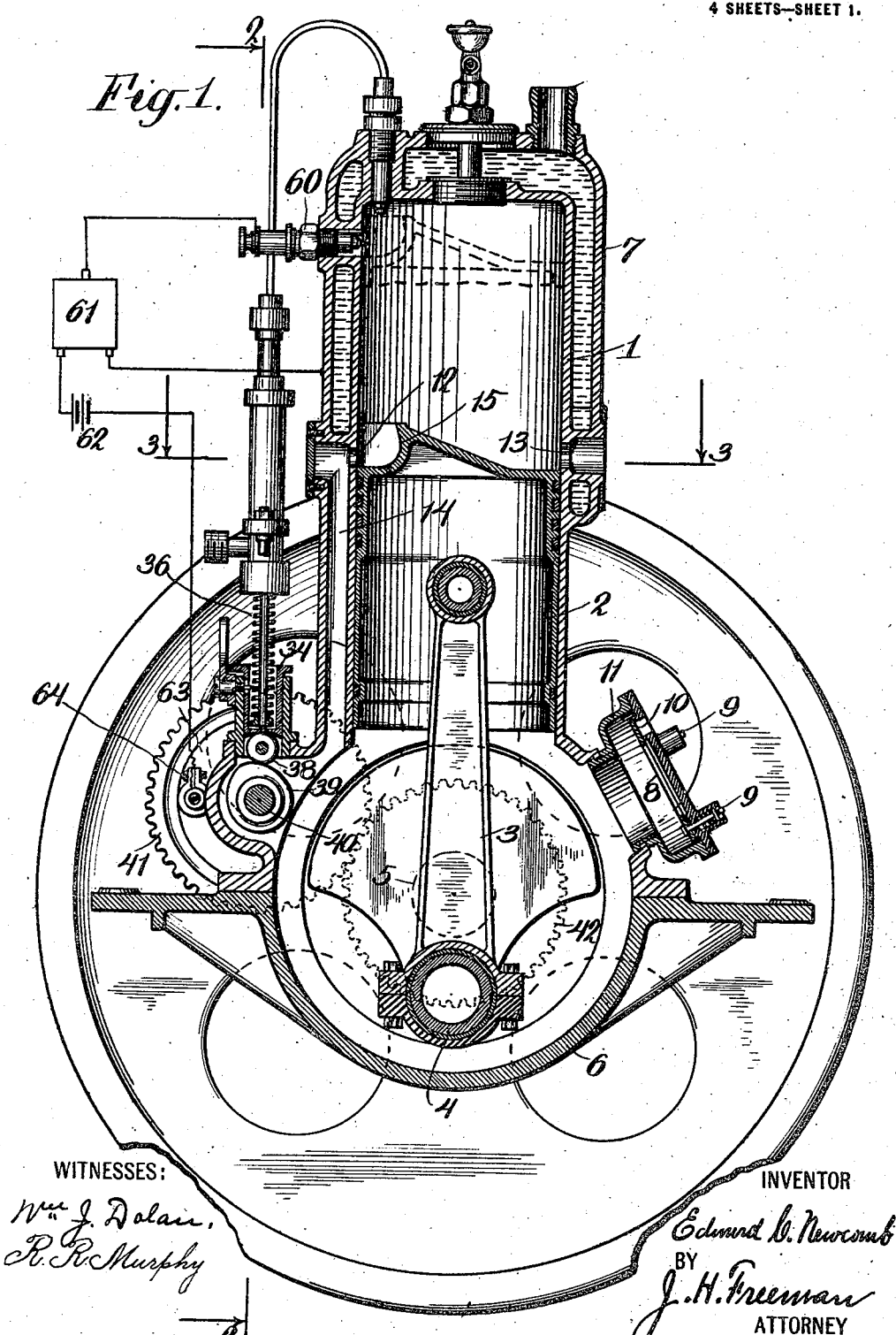

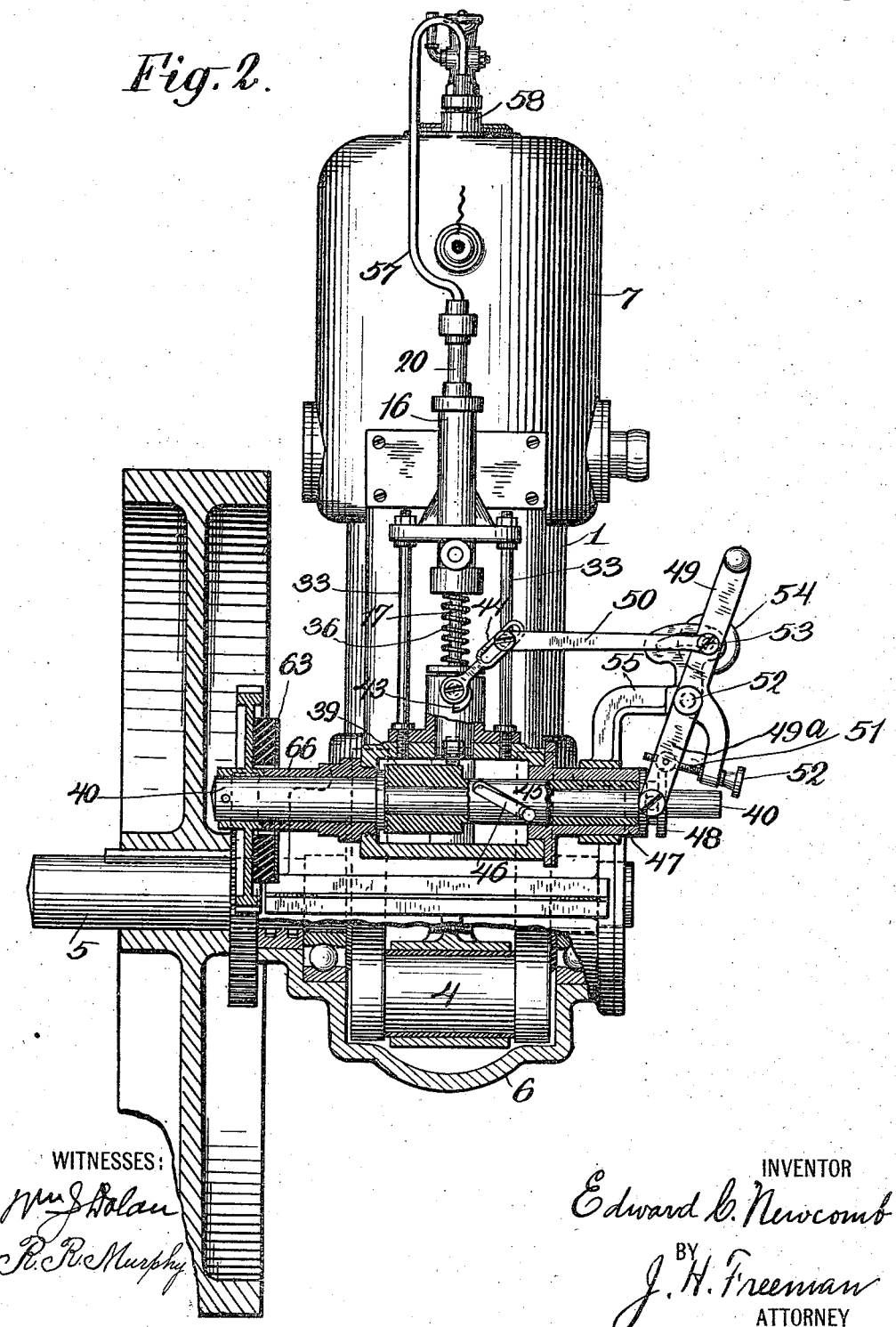

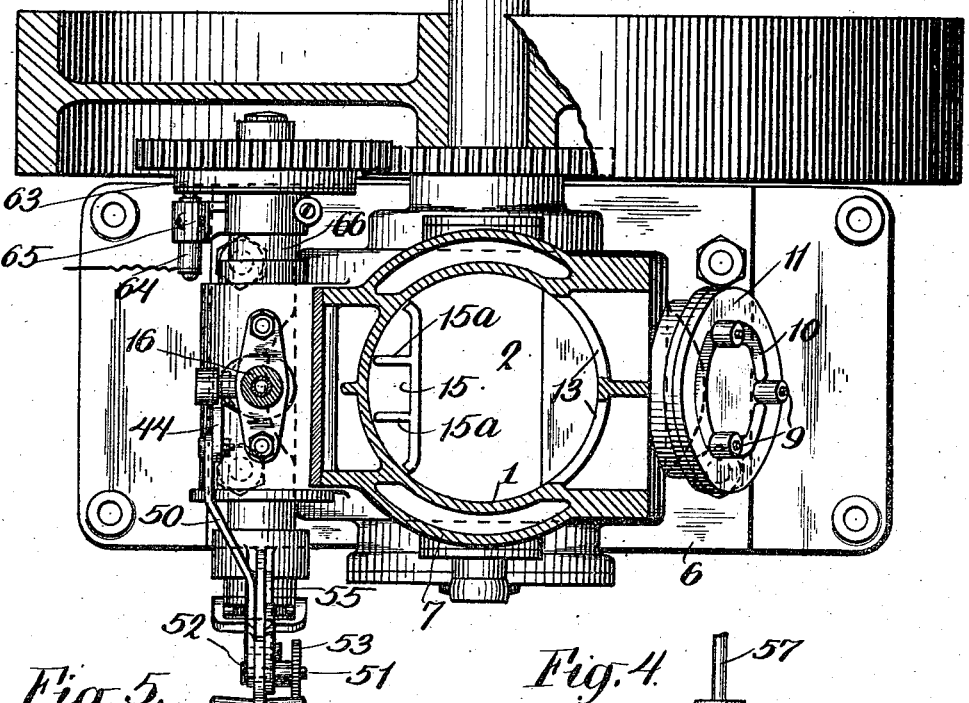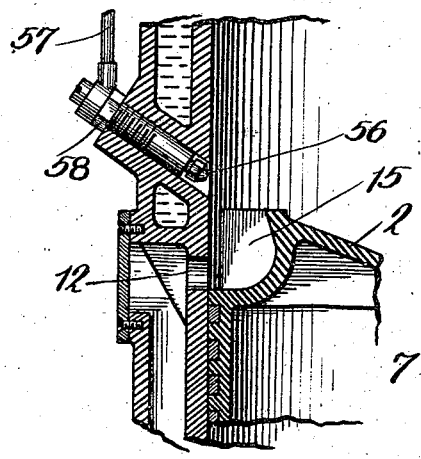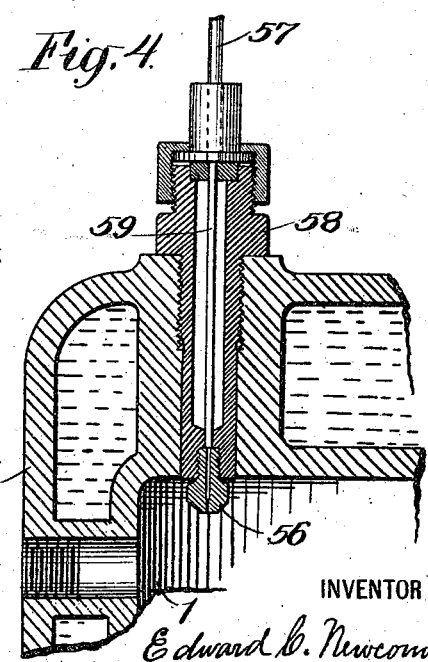

UNITED STATES PATENT OFFICE.

EDWARD C. NEWCOMB, OF NORTH SCITUATE, MASSACHUSETTS, ASSIGNOR TO NEWCOMB ENGINE COMPANY, OF NEW YORK, N. Y., A CORPORATION OF NEW YORK.

INTERNAL-COMBUSTION ENGINE.

1,139,898.  Specification of Letters Patent.  Patented May 18, 1915.

Application filed May 1, 1909, Serial No. 493,287. Renewed September 9, 1913. Serial No. 788,937.

*To all whom it may concern:*

Be it known that I, EDWARD C. NEWCOMB, a citizen of the United States, and a resident of North Scituate, county of Plymouth, and Commonwealth of Massachusetts, have invented certain new and useful Improvements in Internal-Combustion Engines, of which the following is a specification.

My invention relates to internal combustion engines, and more particularly to that type of engine set forth in my prior application, Serial No. 391,759, filed September 7, 1907. In this type of engine the air and fuel charges are independently supplied to the piston chamber in such manner that at the ends of the compression periods variable portions of the air charges will be effectively carbureted according to the sizes of the fuel charges.

The present invention has for its object the provision of means for supplying and controlling the supplies of air and fuel with certainty and precision whereby the engine will operate reliably and with great uniformity and efficiency through a wide range of speed and load variations.

The invention consists in the novel devices, combinations, improvements, and features of construction herein shown and described.

The accompanying drawings, which are referred to herein and form a part hereof, illustrate an embodiment of the invention, which, taken in connection with the description will serve to explain the principles of the invention and one way of carrying the same into effect.

Of the drawings: Figure 1 is a vertical central section of a two-cycle engine constructed in accordance with my invention; Fig. 2 is a vertical section taken principally on the line 2—2 of Fig. 1 but showing parts in elevation and the lower part of the engine in vertical section; Fig. 3 is a sectional plan taken on the line 3—3 of Fig. 1, part of the fly wheel being broken away to illustrate certain details; Fig. 4 is a vertical central section, illustrating a detail on an enlarged scale; Fig. 5 is a similar view, illustrating a modification; Fig. 6 is a vertical central section, illustrating certain features of the construction in detail on an enlarged scale; Fig. 7 is a side elevation, illustrating another feature of the construction; and Fig. 8 is a diagrammatic view, illustrating the construction of a cam forming part of the fuel-injecting means.

The particular embodiment of the invention illustrated in the drawings comprises a cylinder 1, containing a piston 2 which is connected by the connecting rod 3 with a crank 4 on the main shaft 5, the whole being mounted on a base 6. The cylinder 1 is shown as provided with a water jacket 7; but, if desired, air-cooling means may be employed. Any suitable means may be employed for supplying the charges of air to the piston chamber formed by the cylinder 1. As shown, the crank 4 is inclosed in a casing or chamber formed in part by the lower portion of the cylinder casting and in part by the base 6. The air is admitted to this chamber through an automatic inlet valve 8. While any suitable form of inlet valve may be employed, the construction illustrated is preferred on account of the large air admission area provided thereby. This valve consists of a ring mounted on a plurality of spring-pressed stems 9 so as to normally close an annular port 10 in the cover of the valve case 11. It will be seen that when this valve is opened by atmospheric pressure, two openings are formed, one at each side of the ring, giving an admission area which is practically double that afforded by a valve of the ordinary construction.

The piston chamber is provided with an air inlet port 12 and exhaust port 13 for the waste gases, said ports being arranged to be opened by the piston, when near the end of its working stroke, the exhaust port being opened slightly before the inlet port to permit the pressure of the waste gases to fall before the air inlet port is opened. The air inlet port 12 communicates with the air-compressing crank chamber by a passage 14. In order that the incoming air may be directed away from the exhaust port in such manner as to displace the waste gases and thus scavenge the cylinder, the piston 2 is provided at one side of its working face with a recess 15 having an upwardly curved wall adapted to direct the incoming air toward the top of the piston chamber. In accordance with one feature of the invention, the air inlet port 12 and recess 15 are peculiarly formed, as will be hereinafter fully explained.

The fuel in the form of a liquid is supplied to the cylinder independently of the air by means adapted to vary the fuel charges and to control the diffusion of the fuel in the air so that variable portions of the air charges will be effectively carbureted at or near the ends of the compression periods. The fuel-injecting means includes a peculiarly constructed pump, one form of which is illustrated in detail in Fig. 6. As shown, this pump comprises a suitable barrel 16 in the bore of which is located a hollow plunger 17. The bore of the barrel terminates in a delivery port 18 which, for convenience of construction, is formed in a disk 19 seated near the end of the barrel 16 and secured in place by a valve casing 20. This delivery port is normally closed by a valve 21 suitably guided in the casing 20. For the purpose of greater certainty in the operation of the pump, a second delivery valve 22 may be employed, the same being arranged to coöperate with a suitable seat provided in the casing 20. The plunger 17 is made hollow to provide an inlet port 23 which is normally closed by an inlet valve 24, preferably seated directly at the inner end of the plunger, as shown. This valve is preferably retained to its seat by a light tension spring 25 which is arranged between the valve 24 and a suitable fastening 26 within the hollow plunger. The delivery valves 21, 22 may be seated by light springs, if desired, the same being conveniently in the form of light compression springs located within the hollow valves. The supply of fuel may be admitted to the hollow plunger in any suitable way. As shown, the barrel 16 is provided with an inlet port 27 which communicates with the plunger through a perforated sleeve 28 which is arranged between the packings 29 and 30, the latter being located in an enlarged bore of the barrel 16 and compressed therein by a threaded cap 31 and sleeve 32. The plunger is perforated at a point opposite the sleeve 28 to admit the fuel to the inlet passage therein.

Any suitable means may be provided to effect a relative reciprocating movement between the pump barrel and the plunger, as required to force the liquid therethrough. In accordance with the preferred construction, the pump barrel 16 is stationarily mounted in upright position on the engine casing, as by means of the pillar rods 33. This, or a similar form of support, is preferred in order to prevent the conduction of heat to the pump barrel which would be liable to vaporize the fuel.

The pump plunger may be reciprocated from the engine by any suitable means adapted to properly time the pump with the engine piston and to permit the throw of the plunger to be varied, as required to vary the fuel charges in accordance with the variations of load. In accordance with the preferred construction, this means is constructed to drive the plunger substantially to the end of the bore of the pump barrel so as to displace practically all the fluid therein, the throw of the pump being varied by varying the extent of the return stroke. By reason of this arrangement and of the peculiar construction of the pump and barrel, the pump is provided with a minimum clearance volume so that there is no opportunity for any air or fuel vapors to collect in the pump so as to render the same inoperative or vary the effective displacement thereof, even when the pump is operated with a very slight stroke, as required to supply the minimum charges of fuel.

In accordance with the construction shown, the pump plunger is forced into the pump barrel by a cam driven from the engine shaft and is retracted by a spring. To this end, the end of the plunger 17 is seated in a vertically sliding member 34 suitably guided in a casing 35 fixed on the engine casing at one side of the cylinder 1. The plunger together with the member 34 is normally forced in a downward direction by a spring 36 arranged between the cap 31 and a head 37 fixed at the lower end of the plunger. The member 34 is provided with an anti-friction roller 38 which rests upon a cam 39. This cam is mounted on a shaft 40, suitably journaled in the casing and driven from the main shaft 5 by the gears 41, 42 which are preferably so proportioned that the shaft 40 will make turn for turn with the main shaft 5. The parts are so proportioned that the cam will lift the pump plunger substantially to the limit of its allowable movement in the barrel 16. The return movement or suction stroke of the plunger may be limited and varied by any suitable means to determine and vary the sizes of the fuel charges. As shown, a variable stop device in the form of a cam 43 is pivoted on the casing 35 so that it may be moved into the path of a stop shoulder on the member 34. The cam 43 is provided with an operating arm 44 whereby it may be turned to bring any portion of the cam into coöperation with the stop shoulder to variably limit its downward movement, as desired.

In order to obtain the best results in this type of engine, it is necessary to vary the fuel injecting period with relation to the movements of the engine piston in accordance with variations in the sizes of the fuel charges, and also in accordance with variations in the speed of the engine. This is accomplished by varying the timing of the pump operating cam 39 with relation to the crank-shaft of the engine in any suitable way. As shown, the cam 39 is elongated and sleeved on the shaft 40, as clearly shown in Fig. 2, so that it may be moved lengthwise of the shaft. The cam is connected with the shaft by a pin 45 which projects from the shaft and engages in a spiral slot 46 in the sleeve of the cam so that when the cam is moved endwise, it will be turned around the shaft. Any suitable means may be provided for shifting the cam on the shaft. As shown, the sleeve is projected beyond the bearing 47 at one end of the shaft and is provided outside of said bearing with a grooved collar 48, which is engaged by an arm 49$^a$ of a lever 49. In order that the fuel injecting periods may be varied simultaneously with the sizes of the fuel charges, as required to secure the best results, the cam-shifting lever 49 is connected with the plunger controlling cam 43 so that the two cams will be operated simultaneously by the operation of the lever 49. This is accomplished by connecting the operating arm 44 of the cam 43 with the lever 49 by a link 50, this link preferably being adjustably connected with the operating arm 44 so as to vary the relation between the two pump controlling cams, as required to secure the best results. Any suitable means may be provided for shifting the cam 39 independently of the cam 43, as required to vary the fuel injecting periods without varying the size of the fuel charges in accordance with variations in the speed of the engine. As shown, this is accomplished by providing means for shifting the arm 49$^a$ independently of the operating lever 49. To this end, the arm 49$^a$ is connected to the lever 49 by threaded link 51 having a hand wheel 52 by the turning of which the arm is shifted, and means are provided, as a bolt 53 and clamp nut 54, to hold the lever 49 in its adjusted position. The bolt 53 may form the connection between the lever 49 and the link 50. When this bolt is fastened and the hand wheel 52 turned, it will be seen that the cam 39 will be shifted without shifting the cam 43 so that the time of operation of the pump or the fuel-injecting period may be varied without varying the size of the fuel charges. By loosening the bolt 53 the two cams 39 and 43 will be operated simultaneously, as required to vary the size of the fuel charges and to correspondingly vary the periods of their injections.

The fuel delivered by the pump is injected directly into the piston chamber of the engine through a nozzle 56 which is connected with the delivery port of the pump by a pipe 57. The preferred form of the nozzle is illustrated in detail in Fig. 4. In order that the variable fuel charges may be diffused in portions only of the air charges and in portions of the air charges which correspond substantially with the sizes of the fuel charges, the fuel is delivered into the piston chamber in fine compact jets having high velocities, said jets being directed onto a wall in the piston chamber so that the fuel will be diffused in the air by the impact thereof against said wall, and the diffusion of the fuel by impact is controlled or restrained so as to confine it within the required portions of the air charges. The fuel is also preferably caused to impact on a wall which is swept by the incoming air charges so as to avoid any accumulation of residue thereon. To this end, the fuel jets are directed into the air-deflecting recess 15 of the piston 2, and in order that the diffusion of the minimum fuel charges may be properly restrained, this air-deflecting recess is preferably divided into a plurality of compartments by suitable partitions 15$^a$, the fuel being directed into one of these compartments. The minimum charges of fuel may be injected into the compartment after the air inlet port is closed and during the compression period, so that none of the fuel will be displaced by the incoming air but will be diffused by impact alone and thus confined to the compartment or its immediate vicinity. When, however, the fuel charges become so large that the air in the compartment would be over carbureted or too rich to properly ignite, the fuel injecting period is advanced so that part at least of the fuel will be injected while the air inlet port is open and will be displaced by the incoming air. As the sizes of the fuel charges increase, the fuel injecting periods will be advanced so that more and more of the fuel will be displaced by the incoming air.

In order that this diffusion of the fuel by the incoming air may be controlled, means are preferably provided for controlling or restricing or graduating the admission of the air to the fuel-receiving recess in the cylinder. To this end, the air inlet port 12 is so shaped as to gradually admit the air to the fuel-receiving recess or compartment. In the construction shown the fuel-receiving recess 15 of the piston is divided by the partitions 15$^a$ into three compartments, of which the center one receives the fuel. The air inlet port 12 is divided at the center, and the walls are shaped, as indicated at 12$^a$ in Fig. 7, so that the openings by which air is admitted to the central compartment are decreased laterally as well as vertically during the first part of the up stroke of the piston, thereby cutting down the quantity of air admitted to the central compartment and permitting the smaller fuel charges to be injected at earlier periods of the piston stroke and still have them in proper condition for ignition at or near the ends of the compression strokes.

In order that the fuel may be delivered in fine compact streams having a high velocity, even when the engine is running at low speed, the opening in the nozzle 56 should be made very small. Good results have been produced in an engine developing about 15 horsepower at nine hundred revolutions with a cylindrical nozzle opening about one-hundredth of an inch in diameter. To procure the best results, the fuel injecting periods must be timed with certainty and precision both as to their beginning and ending. To this end, it is desirable that the capacity of the passages between the pump and the nozzle should be made as small as possible without unduly increasing the pressure required to force the fluid through them and no opportunity should be given for the formation or accumulation of air or fuel vapor in said passages. To this end, the inlet valves are constructed to fill as nearly as possible the chambers in the casing 20, and the pipe 57 is made of capillary dimensions and secured at its opposite ends by unions which provide no recesses or chambers for the accumulation of air or vapor. The nozzle 56 is secured in the cylinder by means of a plug 58 which is chambered and provided with a capillary pipe 59 communicating at its opposite ends with the nozzle 56 and pipe 57, respectively, an air chamber being thus provided within the plug 58 so that ordinarily insufficient heat will be communicated to the fuel by conduction to vaporize the fuel and thus displace the same through the nozzle after the pump has completed its fuel injecting stroke. The heat insulating chamber may contain any heat insulating material in place of the air, if desired.

As shown in Figs. 1 and 4, the nozzle 56 is arranged at the top of the cylinder so that the fuel will be directed into the fuel-receiving recess or compartment of the piston at any desired point in the stroke. By reason of this arrangement, moreover, the pump may be operated by hand to inject fuel, as when starting the engine, irrespective of the position of the piston. If desired, however, the fuel injecting nozzle may be located at any point which will enable it to direct the fuel charges into the receiving recess or compartment at the times required to properly diffuse the fuel. As shown in Fig. 5, the fuel nozzle 56 and the plug 58 are arranged in the side wall of the cylinder just above the air inlet port 12, said nozzle being inclined downwardly so as to direct the fuel into the recess 15 of the piston even when the latter is at the lower limit of its stroke. With the nozzle thus located, the minimum fuel charges may be injected into the recess after the inlet port is closed.

To procure the best results the shape of the pump-operating cam should vary in different engines. The shape of the cam may vary, for instance, with the degree of compression in the engine, the size of the fuel injecting nozzle, the maximum speed at which the engine is to run, etc. In order that the best shape of cam for a particular engine or set of conditions may be determined, I have devised an apparatus for determining experimentally the best shape of cam, said apparatus being illustrated and described in my said prior application. It may be stated in general, however, that the cam should be given such shape as to maintain a high velocity of the fuel with the minimum of fuel charges and minimum engine speed and yet avoid the development of undue pressure in the fuel passages when the engine is run at maximum speed with the maximum size of fuel charges. A form of cam adapted for a wide range of speed and fuel charges is diagrammatically illustrated in Fig. 8. In this cam the plunger-forcing arc $a\,b$ occupies about 60 degrees of the circumference of said cam, and with the exception of the last 10 or 15 degrees is formed on an arc struck from a center $c$ located at one side of the center C of the cam and on a line at right angles to the line drawn from the center C to the high point $b$ of the cam and at a distance from the center C about equal to the maximum lift of the cam. The last few degrees of this surface are formed on a tangent line which forms an angle of about 75 degrees with the extension of the line C $b$. The receding surface of the cam may be of any desired length and of any desired shape. For convenience it may be formed on the same arc as the plunger-forcing surface but without the tangent line referred to, as indicated in Fig. 8.

Any suitable form of igniting device may be employed to ignite the carbureted portions of the air charges. As shown, an ordinary form of spark plug 60 is arranged in the cylinder 1 so that the spark is formed in the vicinity of the fuel-receiving recess or compartment of the piston, when the latter is at or near the limit of its compressing stroke. This spark plug may be connected with a coil 61, which coil may be operated by the battery 62 and controlled by the commutator 63 conveniently carried by the gear 41. The contact brush 64 of the commutator may be adjustably supported in an arm 65 pivoted on the bearing 66 of the shaft 40 so that the time of ignition may be adjusted or varied, as required to secure the best results.

It is to be understood that my invention in its broader aspects is not confined to the particular construction herein illustrated or to any particular construction by which it has been or may be carried into effect, as many changes may be made in the details of the construction without departing from the main principles of the invention and without sacrificing its chief advantages.

I claim:

1. An internal combustion engine of the compression type including in combination, means for supplying charges of air to the combustion chamber, and means for injecting charges of a liquid fuel into said chamber, said last-mentioned means comprising a pump barrel having a bore terminating in a delivery port, a valve seated in said delivery port, a plunger in said barrel having an inlet port, a valve seated in said inlet port, said plunger and valve being fitted to displace practically all of the fluid therein, means driven by the engine for producing a relative reciprocating movement between the barrel and the plunger, and a nozzle communicating with said delivery port and arranged to direct the fuel into said combustion chamber.

2. An internal combustion engine of the compression type including in combination, means for supplying charges of air to the piston chamber, and means for injecting charges of a liquid fuel into said chamber, said last-mentioned means comprising a pump barrel having a bore terminating in a delivery port, a valve seated in said delivery port, a plunger in said barrel having an inlet port, a valve seated in said inlet port, said plunger and valve being fitted to displace practically all of the fluid therein, means driven by the engine for producing a relative reciprocating movement between the barrel and the plunger, and a nozzle communicating with the said delivery port and arranged to direct the fuel onto a wall in said piston chamber which is swept by the incoming air charges, said wall being shaped to restrain the extent of diffusion of the fuel by impact therewith.

3. An internal combustion engine of the compression type including in combination, means for supplying charges of air to the piston chamber, and means for injecting charges of a liquid fuel into said chamber, said last-mentioned means comprising a pump barrel having a bore terminating in a delivery port, a plunger in said barrel having an inlet port, a valve seated in said inlet port, means driven by the engine for producing a relative reciprocating movement between the barrel and the plunger, means for varying the length of said reciprocating movement to vary the sizes of the fuel charges, a nozzle communicating with said delivery port and arranged to direct the fuel in compact jets onto a wall in said chamber which is swept by the incoming air charges, said wall being shaped to restrain the extent of the diffusion of the fuel by impact therewith, and means for advancing the fuel injecting period as the sizes of the fuel charges increase.

4. An internal combustion engine of the compression type including in combination, means for supplying charges of air to the piston chamber, said means being constructed to admit the air under pressure into said chamber near the ends of the working strokes of the piston, and means for injecting charges of a liquid fuel into said chamber, said last-mentioned means comprising a pump barrel having a bore terminating in a delivery port, a valve seated in said delivery port, a plunger in said barrel having an inlet port, a valve seated in said inlet, said plunger and valve being fitted to displace practically all the fluid therein, means driven by the engine for producing a relative reciprocating movement between the barrel and the plunger, and a nozzle communicating with said delivery port and arranged to direct the fuel in compact jets onto a wall in said chamber which is swept by the incoming air charges, said wall being shaped to restrain the extent of the diffusion of the fuel by impact therewith.

5. An internal combustion engine of the compression type including in combination, means for supplying charges of air to the piston chamber, said means being constructed to admit the air under pressure into said chamber near the ends of the working strokes of the piston, and means for injecting charges of a liquid fuel to the said chamber, said last-mentioned means comprising a pump barrel having a bore terminating in a delivery port, a valve seated in said delivery port, a plunger in said barrel having an inlet port, a valve seated in said inlet port, means driven by the engine for producing a relative reciprocating movement between the barrel and the plunger, a nozzle communicating with said delivery port and arranged to direct the fuel in compact jets onto a wall in said chamber which is swept by the incoming air charges, said wall being shaped to restrain the extent of the diffusion of the fuel by impact therewith, and means for advancing the fuel injecting periods with relation to the piston as the speed of the engine increases.

6. An internal combustion engine of the compression type including in combination, means forming a piston chamber, with inlet and exhaust ports for air and waste gases respectively, a piston, one of said parts having a recess arranged to be swept by the incoming air and to partly inclose a small portion of the compressed charge, and means for injecting charges of a liquid fuel into said recess, said last-mentioned means comprising a pump barrel having a bore terminating in a delivery port, a valve seated in said delivery port, a plunger in said barrel having an inlet port, a valve seated in said inlet port, said plunger and valve being fitted to displace practically all the fluid therein, means driven by the engine for producing a relative reciprocating movement between the barrel and the plunger, and a nozzle communicating with said delivery port and arranged to direct the fuel into said recess.

7. An internal combustion engine of the compression type including in combination, means forming a piston chamber with inlet and exhaust ports for air and waste gases respectively, a piston, one of said parts having a recess arranged to be swept by the incoming air and to partly inclose a small portion of the compressed charge, means for injecting charges of a liquid fuel into said recess, said last-mentioned means comprising a pump barrel having a bore terminating in a delivery port, a valve seated in said delivery port, a plunger in said barrel having an inlet port, a valve seated in said inlet port, means driven by the engine for producing a relative reciprocating movement between the barrel and the plunger, means for varying the length of said reciprocating movement to vary the sizes of the fuel charges, a nozzle communicating with said delivery port and arranged to direct the fuel in compact jets into said recess, and means for advancing the fuel injecting periods with relation to the piston as the sizes of the fuel charges increase.

8. An internal combustion engine of the compression type including in combination, means forming a piston chamber with inlet and exhaust ports for air and waste gases respectively, a piston, one of said parts having a recess arranged to be swept by the incoming air and to partly inclose a small portion of the compressed charge, means for injecting charges of a liquid fuel into said recess, said last-mentioned means comprising a pump barrel having a bore terminating in a delivery port, a valve seated in said delivery port, a plunger in said barrel having an inlet port, a valve seated in said inlet port, means driven by the engine for producing a relative reciprocating movement between the barrel and the plunger, means for varying the length of said reciprocating movement to vary the sizes of the fuel charges, a nozzle communicating with said delivery port and arranged to direct the fuel in compact jets into said recess, means for advancing the fuel injecting periods with relation to the piston as the sizes of the fuel charges increase, and means for advancing the fuel injecting periods with relation to the piston as the speed of the engine increases.

9. An internal combustion engine of the compression type including in combination, a piston, means forming a piston chamber with inlet and exhaust ports for air and waste gases respectively, said ports being arranged to be opened and closed by the piston when near the ends of its working strokes, and said piston having on one side of its working face a recess arranged to be swept by the incoming air and to direct the same away from the exhaust port, said recess in conjunction with the adjacent wall of the piston chamber serving to partly inclose a small portion of the compressed charge, and means for injecting charges of a liquid fuel into said recess, said last-mentioned means comprising a pump barrel having a bore terminating in a delivery port, a valve seated in said delivery port, a plunger in said barrel having an inlet port, a valve seated in said inlet port, said plunger and valve being fitted to displace practically all the fluid therein, means driven by the engine for producing a relative reciprocating movement between the barrel and the plunger, and a nozzle communicating with said delivery port and arranged to direct the fuel into said recess.

10. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger fitted to move substantially to the end of the bore of said barrel and communicating with a source of fuel supply, an inlet valve seated in the end of said plunger, means driven by the engine for reciprocating said plunger, and a nozzle communicating with said delivery port and arranged to direct the fuel into said combustion chamber.

11. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger fitted to move substantially to the end of the bore of said barrel and communicating with a source of fuel supply, an inlet valve seated in the end of said plunger, means driven by the engine for reciprocating said plunger, and a nozzle communicating with said delivery port and arranged to direct the fuel onto a wall in said piston chamber which is swept by the incoming air charges, said wall being shaped to restrain the extent of diffusion of the fuel by impact therewith.

12. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger in said barrel communicating with a source of fuel supply, an inlet valve seated in the end of said plunger, means driven by the engine for reciprocating said plunger, a nozzle communicating with said delivery port and arranged to direct the fuel into said combustion chamber, and means for advancing the fuel injecting periods as the sizes of the fuel charges increase.

13. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger fitted to move substantially to the end of the bore of said barrel and communicating with a source of fuel supply, an inlet valve seated in the end of said plunger, means driven by the engine for reciprocating said plunger, and a nozzle communicating with said delivery port and arranged to direct the fuel in compact jets onto a wall in said chamber which is swept by the incoming air charges, said wall being shaped to restrain the extent of the diffusion of the fuel by impact therewith.

14. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger in said barrel communicating with a source of fuel supply, an inlet valve seated in the end of said plunger, means driven by the engine for reciprocating said plunger, a nozzle communicating with said delivery port and arranged to direct the fuel in compact jets into said chamber, means for advancing the fuel injecting periods with relation to the piston as the sizes of the fuel charges increase, and means for advancing the fuel injecting periods with relation to the piston as the speed of the engine increases.

15. An internal combustion engine of the compression type including in combination, a piston, means forming a piston chamber with inlet and exhaust ports for air and waste gases respectively, said ports being arranged to be opened and closed by the piston when near the ends of its working strokes, and said piston having on one side of its working face a recess arranged to be swept by the incoming air and to direct the same away from the exhaust port, said recess in conjunction with the adjacent wall of the piston chamber serving to partly inclose a small portion of the compressed charge, and means for injecting charges of a liquid fuel into said recess, said last-mentioned means comprising an upright pump barrel having a bore terminating in a delivery port, a valve seated in said delivery port, a hollow plunger fitted to move substantially to the end of the bore of said barrel and having an inlet port, a valve seated in said inlet port, means driven by the engine for producing a relative reciprocating movement between the barrel and the plunger, and a nozzle communicating with said delivery port and arranged to direct the fuel into said recess.

16. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger fitted to move substantially to the end of the bore of said barrel and communicating with a source of fuel supply, an inlet valve seated in the end of said plunger, means driven by the engine for forcing the plunger into the barrel to substantially the end of the bore thereof, means for retracting the plunger, means for varying the extent of the retraction to vary the sizes of the fuel charges, and a nozzle communicating with said delivery port and arranged to direct the fuel into said combustion chamber.

17. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger in said barrel communicating with a source of fuel supply, an inlet valve seated in the end of said plunger, means driven by the engine for forcing the plunger into the barrel to substantially the end of the bore thereof, means for retracting the plunger, means for varying the extent of the retraction to vary the sizes of the fuel charges, a nozzle communicating with said delivery port and arranged to direct the fuel into said combustion chamber; and means for advancing the fuel injecting periods with relation to the piston as the sizes of the fuel charges increase.

18. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger in said barrel communicating with a source of fuel supply, an inlet valve seated in the end of said plunger, means driven by the engine for forcing the plunger into the barrel to substantially the end of the bore thereof, means for retracting the plunger, means for varying the extent of the retraction to vary the sizes of the fuel charges, a nozzle communicating with said delivery port and arranged to direct the fuel into said combustion chamber, means for advancing the fuel injecting periods with relation to the piston as the sizes of the fuel charges increase, and means for advancing the fuel injecting periods with relation to the piston as the speed of the engine increases.

19. An internal combustion engine of the compression type including in combination, means forming a piston chamber, with inlet and exhaust ports for air and waste gases respectively, a piston, one of said parts having a recess arranged to be swept by the incoming air and to partly inclose a small portion of the compressed charge, and means for injecting charges of a liquid fuel into said recess, said last-mentioned means comprising an upright pump barrel having a bore terminating in a delivery port, a valve seated in said delivery port, a hollow plunger in said barrel communicating with a source of fuel supply, an inlet valve seated in the end of said plunger, means driven by the engine for forcing the plunger into the barrel to substantially the end of the bore thereof, means for retracting the plunger, means for varying the extent of the retraction to vary the sizes of the fuel charges, and a nozzle communicating with said delivery port and arranged to direct the fuel into said recess.

20. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a holow plunger in said barrel communicating with a source of fuel supply, an inlet valve seated in the end of said plunger, a cam driven by the engine for forcing the plunger into the barrel to substantially the end of the bore thereof, a spring for retracting the plunger, an adjustable stop to vary the extent of the retraction to change the sizes of the fuel charges, means for shifting the cam to change the fuel injecting period, and a nozzle communicating with said delivery port and arranged to direct the fuel into said combustion chamber.

21. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger in said barrel communicating with a source of fuel supply, an inlet valve seated in the end of said plunger, a cam driven by the engine for forcing the plunger into the barrel to substantially the end of the bore thereof, a spring for retracting the plunger, and means for simultaneously shifting said cam and varying the extent of said retraction, whereby the sizes of the fuel charges and the periods of their injection are simultaneously varied.

22. An internal combustion engine of the compression type including in combination, means for supplying charges of air to the combustion chamber, means for injecting charges of a liquid fuel into said chamber, said last-mentioned means comprising an upright pump barrel having a bore terminating in a delivery port, a valve seated in said delivery port, a hollow plunger in said barrel communicating with a source of fuel supply, an inlet valve seated in the end of said plunger, a cam driven by the engine for forcing the plunger into the barrel to substantially the end of the bore thereof, a spring for retracting the plunger, means for simultaneously shifting said cam and varying the extent of said retraction, whereby the sizes of the fuel charges and the periods of their injection are simultaneously varied, and means for advancing the fuel injecting periods as the speed of the engine increases.

23. An internal combustion engine of the compression type including in combination, a piston, means forming a piston chamber with inlet and exhaust ports for air and waste gases respectively, said inlet port being arranged to be opened and closed by the piston, said piston having on one side of its working face a recess arranged to be swept by the incoming air, said inlet being shaped to gradually admit the air to said recess, and means for injecting charges of a liquid fuel into said recess, part of the fuel being injected during the admission of the air.

24. An internal combustion engine of the two-cycle type including in combination, a compressed air inlet port, a piston having an air deflecting recess, and means for injecting fuel into said recess during the air admission period, said air inlet port being shaped to admit the air to said recess gradually.

25. An internal combustion engine of the two-cycle type including in combination, a compressed air inlet port, a piston having an air deflecting recess divided into a plurality of compartments, and means for injecting a liquid fuel into one of said compartments, the air transfer port being shaped to gradually admit the air into said last-mentioned compartment.

26. An internal combustion engine of the compression type including in combination, means for supplying charges of air to the combustion chamber, and means for injecting charges of a liquid fuel into said chamber, said last-mentioned means comprising a nozzle, and a plug carrying said nozzle, said plug being connected to the walls of the combustion chamber and having a chamber containing heat insulating material, and means for conducting the fuel through said chamber to the nozzle.

In testimony whereof, I have signed my name to this specification, in the presence of two subscribing witnesses.

EDWARD C. NEWCOMB.

Witnesses:
  WM. J. DOLAN,
  EDWIN SEGER.